United States Patent [19]

Nakajima et al.

[11] Patent Number: 4,520,866

[45] Date of Patent: Jun. 4, 1985

[54] FALLING FILM EVAPORATION TYPE HEAT EXCHANGER

[75] Inventors: Tadakatsu Nakajima, Ibaraki; Wataru Nakayama, Kashiwa; Takahiro Daikoku, Ibaraki, all of Japan

[73] Assignee: Hitachi, Ltd., Tokyo, Japan

[21] Appl. No.: 498,554

[22] Filed: May 26, 1983

[30] Foreign Application Priority Data

May 26, 1982 [JP] Japan ................................ 57-87934

[51] Int. Cl.³ ............................................. A23C 3/04
[52] U.S. Cl. .................................... 165/115; 62/527; 165/133; 165/118
[58] Field of Search ...................... 165/115, 118, 133; 62/527

[56] References Cited

U.S. PATENT DOCUMENTS 2,267,568  12/1941  Kleucker .................. 165/115 X

FOREIGN PATENT DOCUMENTS 507766  4/1976  U.S.S.R. ..................... 165/115

*Primary Examiner*—Allen M. Ostrager
*Attorney, Agent, or Firm*—Antonelli, Terry & Wands

[57] ABSTRACT

A falling film evaporation type heat exchanger of the shell-tube type which includes an outer shell or main body portion and a plurality of individual heat transfer tubes disposed therein, with the heat transfer tubes extending substantially in a vertical direction. A liquid refrigerant is caused to freely fall from upper portions of the heat transfer tubes along the outer peripheral surfaces of the tubes and the evaporation of the thin refrigerant film, formed on the outer peripheral surface of the heat transfer tubes effects the transfer.

18 Claims, 9 Drawing Figures

FALLING FILM EVAPORATION TYPE HEAT EXCHANGER

The present invention relates to a heat exchanger and, more particularly, to a falling film evaporation type heat exchanger suitable for use in large capacity evaporators and low temperature fluid evaporators, which heat exchanger includes a shell and a plurality of transfer tubes.

Large capacity, low temperature fluid evaporators have been proposed wherein a shell tube type heat exchanger of the aforementioned type is provided which includes a shell and a plurality of heat transfer tubes extending in a horizontal direction, with the plurality of heat transfer tubes being filled with liquid refrigerant.

Heat exchangers of the aforementioned type employ a nucleate pool boiling heat transfer as a heat transfer mode on a refrigerant side and, for this purpose, various fine surface structures have been proposed as the heat transfer surfaces in order to improve the boiling heat transfer performance on the refrigerant side; however, any further drastic improvement of the heat transfer performance by virtue of the provision of fine surface structures can no longer be expected because the upper limit of such improvements as presently been substantially attained.

In heat exchanger constructions of the aforementioned type, since the level of liquid refrigerant effects the performance of the nucleate pool boiling heat transfer, the heat transfer performance tends to drop with an increasing liquid refrigerant level. This tendency of a drop in the heat transfer performance becomes particularly remarkable with the decrease of evaporation temperature and, in fact, becomes a critical problem in the low temperature fluid evaporator. For this reason, most of the low temperature fluid evaporators employ a spray type falling film evaporator which sprays a liquid refrigerant to the heat transfer tubes in a manner described more fully in, for example, "AMSE Publication, 78-WA/HT-67", 1978, pp 1–8, wherein the provided spray type evaporator sprays liquid refrigerant to a group of horizontally disposed heat transfer tubes. A disadvantage of this type of proposed evaporator resides in the fact that a thick film is retained at the lower portions of the heat transfer tubes so that the heat resistance of the liquid film also increases proportionally. Moreover, the construction of a liquid refrigerant spray tube becomes complicated since the spray liquid must be uniformly sprayed to the entire portion of the group of the heat transfer tubes.

The aim underlying the present invention essentially resides in providing a falling film evaporation type heat exchanger which is simple in construction and which yet, in a remarkable manner, can improve the overall heat transfer performance.

In accordance with advantageous features of the present invention, a falling film evaporator type heat exchanger is provided wherein heat transfer tube bundles are disposed substantially vertically in a shell and extend substantially perpendicular to a longitudinal axis of the shell, with liquid refrigerant being caused to freely fall from the upper portions of the heat transfer tube bundles along outer peripheral surface of the heat transfer tubes so that an evaporation of a thin film of liquid refrigerant, formed on the outer peripheral surface of the heat transfer tubes, causes an efficient heat transfer.

Advantageously, according to the present invention, liquid refrigerant distributors, disposed substantially perpendicular to the heat transfer tubes are provided for causing the liquid refrigerant to fall freely along the outer peripheral surface of the heat transfer tubes, with the liquid refrigerant distributors being fixed relative to upper portions of the bundles of heat transfer tubes and a liquid refrigerant supply means. Additionally, refrigerant vapor outlets and liquid refrigerant discharge ports are disposed on a side wall of the shell and an evaporation of the falling film of liquid refrigerant on the outer peripheral surfaces of the heat transfer tube exchanges the heat with a fluid flowing inside of the heat transfer tubes.

Advantageously, the liquid refrigerant distributors are disposed at least at an upper and intermediate portion of the bundles of the heat transfer tubes.

In accordance with still further features of the present invention, liquid refrigerant headers are provided on the side wall of the shell, with the headers serving as the liquid refrigerant supply means. The liquid refrigerant is supplied from the liquid refrigerant headers to the liquid refrigerant distributors.

Preferably, the liquid refrigerant distributors are constructed so as to serve as a support disc structure supporting the bundles of the heat transfer tubes inside the shell.

Advantageously, in accordance with yet further features of the present invention, the liquid refrigerant discharge ports are disposed on a side wall of the shell at least in proximity of a bottom of the shell so that lower portions of the heat transfer tubes function as a liquid dipping type evaporator.

It is also possible in accordance with the present invention, for the liquid refrigerant discharge ports disposed on a side wall of the shell to be disposed at least between a bottom and intermediate portion of the shell thereby also enabling the lower portion of the heat transfer tube to function as a liquid dipping type evaporator.

Accordingly, it is an object of the present invention to provide a falling film evaporation type heat exchanger which avoids, by simple means, shortcomings and disadvantages encountered in the prior art.

Another object of the present invention resides in provide a falling film evaporation type heat exchanger which is simple in construction and therefore relatively inexpensive to manufacture.

Yet another object of the present invention resides in providing a falling film evaporation type heat exchanger which significantly improves the overall heat transfer performance of the heat exchanger.

A still further object of the present invention resides in providing a falling film evaporator type heat exchanger which maximizes the heat transfer efficiency between heat transfer tubes thereof and a liquid refrigerant.

A still further object of the present invention resides in providing a falling film evaporation heat exchanger wherein the heat transfer can maintain a high performance even when an organic refrigerant such as R-11 is used as a process or operating fluid.

Yet another object of the present invention resides in providing a falling film evaporation heat exchanger which exhibits high performance characteristics even at a low refrigerant flow rate with the overall performance being stabilized if the heat transfer surface is porous.

A further object of the present invention resides in providing a falling film evaporation heat exchanger in a shell tube-type heat exchanger which enables a reduction in the overall size and weight of the heat exchanger and which promotes a saving of necessary resources.

A still further object of the present invention resides in providing a heat exchanger which is capable of having a variable capacity.

Another object of the present invention resides in providing a heat exchanger adapted to be self controlling in dependence upon the heat load.

Yet another object of the present invention resides in providing a falling film evaporation heat exchanger which drastically improves and stabilizes heat transfer performance characteristics as compared with prior art heat exchangers.

These and other objects, features, and advantages of the present invention will become more apparent from the following description when taken in connection with the accompanying drawings which show, for the purpose of illustration only, several embodiments in accordance with the present invention, and wherein:

Figure 1:
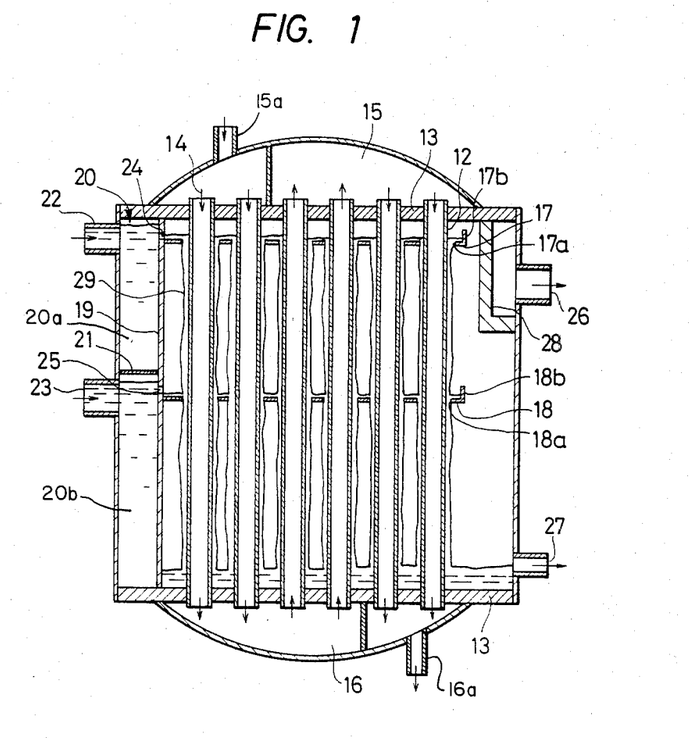
FIG. 1 is a longitudinal cross sectional view of a falling film evaporation type heat exchanger constructed in accordance with the present invention.
Figure 2:
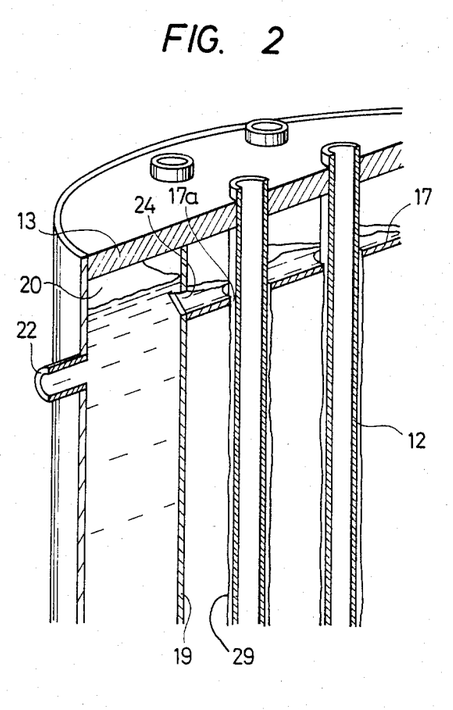
FIG. 2 is a cross sectional perspective view, on an enlarged scale, of principle elements of the heat exchanger of FIG. 1.

Referring now to the drawings wherein like reference numerals are used throughout the various views to designate like parts and, more particularly, to FIGS. 1 and 2, according to these figures, a shell tube-type heat exchanger includes a large number of heat transfer tubes 12 juxtaposed inside an outer shell and extending in a vertical direction, with upper and lower ends of the tubes 12 being respectively fixed by a tube sheet 13. Headers 15, 16, are provided for supplying a fluid 14 into the heat transfer tubes 12, with the headers 15, 16 being constructed and disposed so as to define a plurality of flow paths to the outside of the tube sheets 13 such as, for example, a three-coolant path illustrated in FIG. 1. Refrigerant distributors 17, 18, serving also as heat transfer tube support discs, are disposed at least at upper and intermediate portions of the heat transfer tubes 12. The tubes 12 penetrate or extend through openings in the distributors 17, 18 with the tubes and openings being dimensioned such a spacing exists between an outer peripheral surface of the respective tubes 12 and an inner surface of the openings in the distributor 17, 18 so as to define predetermined openings 17a, 18a. The respective distributors 17, 18 terminate at end portions thereof in liquid seal portions 17b, 18b.

A refrigerant header generally designated by the reference numeral 20 is provided between the tube sheets 13 and is partitioned off from a portion of the shell by a partition wall 19. Another partition wall 21 is arranged in the refrigerant header 20 so as to divide the same into upper and lower chambers 20a, 20b. Refrigerant inlets 22, 23 are respectively disposed in the chambers 20a, 20b so as to enable a supply of refrigerant to the refrigerant header 20. Refrigerant outflow or discharge ports 24, 25 respectively introduce the refrigerant from the upper and lower chambers 20a, 20b into each of the refrigerant distributors 17, 18. The refrigerant discharge ports 24, 25 are disposed in the partition wall 19 and respectively communicate with the chambers 20a, 20b. A vapor discharge or outlet 26 and a refrigerant discharge port 27 are respectively disposed at the upper and lower portions of the main body or shell of the heat exchanger, with an eliminator means 28 being disposed in an area of the discharge outlet 26 for preventing an outflow of the refrigerant mist from the heat exchanger.

In operation of the heat exchanger of FIGS. 1 and 2, the refrigerant inside the refrigerant header 20, supplied from the refrigerant inlets 22, 23 to the respective chambers 20a, 20b, is caused to flow into the refrigerant distributors 17, 18, through the refrigerant outflow or discharge ports 24, 25 in the partition wall 19, and further flows down along an outer peripheral surface of each of the heat transfer tubes 12 through the openings 17a, 18a thereby forming a liquid film 29 on the outer surface of each of the heat transfer tubes 12. The falling liquid refrigerant film 29 receives the heat from the fluid flowing inside each of the heat transfer tubes 12, changes into a vapor and flows outside of the heat exchanger through the vapor discharge or outlet 26. By virtue of the construction of the heat exchanger of FIGS. 1 and 2, the fluid 14, supplied to the header 15 through an inlet port or opening 15a, flows inside the heat transfer tubes 12 in a vertical direction along the heat transfer tube bundles from the header 15 to the header 16 with the liquid refrigerant film 29 flowing down along the outer surface of the heat transfer tubes 12, with the fluid 14 thereafter being withdrawn from the header 16 to the outside of the heat exchanger through a discharge port or opening 16a.

Figure 3:
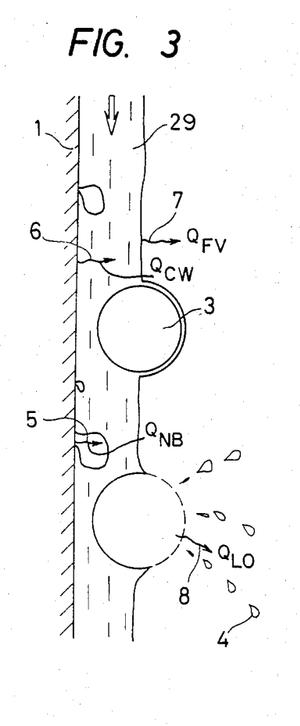
FIG. 3 is a schmatic view illustrating a principle of a falling film evaporation heat transfer in a falling film evaporation type heat exchanger constructed in accordance with the present invention.

The heat transfer performance by the film evaporation heat exchanger of the present invention can be improved as compared with a nucleate boiling pool heat transfer construction as evident from a review of FIG. 3 which illustrates the four heat transport modes which exist in the heat transfer mechanism from the heat transfer surface 1 to the falling refrigerant film 29. More particularly, a first heat transport mode ($Q_{NB}$), represented by the arrow 5, results from a growth and departure of bubbles on the wall 1, i.e., a nucleate pool boiling heat transport, with a second heat transfer mode ($Q_{CW}$), represented by the arrow 6, resulting from a compulsive heat convection from the wall surface 1 to the falling refrigerant film 29 flowing along the outer peripheral surface of the tubes 12. A third heat transport mode ($Q_{FV}$), represented by the arrow 7, corresponds to the latent heat transfer resulting from an evaporation from a surface of the liquid refrigerant film 29, with a fourth heat transport mode ($Q_{LO}$), represented by the arrow 8, corresponding to a sensible heat transfer by droplets 4 generated when the bubbles 3 in the liquid refrigerant film 29 are emitted from the gas-liquid interface. Each of these heat transport modes ($Q_{NB}$, $Q_{CW}$, $Q_{FV}$, $Q_{LO}$) does not act singly but serves mutually as an agitation source for the other heat transport modes thereby promoting the other heat transfer modes.

On the other hand, it is believed that when the film evaporation heat transfer is carried out by use of an organic refrigerant such as, for example, Freon, the heat transfer promotion effect is not as remarkable as compared with, for example water because the latent heat, specific heat, and thermal conductivity of the organic solvent are less than that of water. However, as can be seen from FIG. 4, the heat transfer coefficient a is enhanced in the film evaporation heat transfer using the refrigerant R-11 as the process fluid. An enhancing ratio of the heat transfer coefficient $a/Q_{PB}$ of the film evaporation heat transfer coefficient a to the nucleate pool boiling heat transfer coefficient $Q_{PB}$ in FIG. 5 is plotted along the ordinate, with the heat flux q(W/cm²) being plotted along the abscissa. The relationship illustrated in FIG. 4 was derived by employing a flat plate heat transfer surface having a length of 300 mm and a width of 100 mm, with the heat transfer surface being polished by emery #1000, and with the process fluid being refrigerant R-11, which refrigerant is caused to flow from an upper end of the heat transfer surface to a lower end thereof at a rate of 2.64 g/S per unit width.

With a smooth surface forming the heat transfer surface of a falling film evaporation heat exchanger, a spreadability or flowability of the refrigerant film is low along the heat transfer surface and, consequently, dry patches are likely to occur. Thus, it is necessary for a greater quantity of refrigerant to flow along the heat transfer surface. Therefore, it is necessary to improve the spreadability of the refrigerant and to provide a heat transfer surface which eliminates the occurrence of dry patches thereon even if the liquid flow rate is made as small as possible, which flow rate ideally would be a flow rate at which the whole refrigerant evaporates by the caloric input applied thereto, while nevertheless achieving a high heat transfer property even at a low flow rate. One possible manner of providing a heat transfer surface which eliminates the occurrences of dry patches and which has a high heat transfer property even at a flow rate resides in fashioning the heat transfer surface as a porous heat transfer surface which draws or sucks the refrigerant by its surface tension and forms a refrigerant film over an entire portion along an outer surface of the heat transfer surface.

FIG. 5 provides an example of a minimum required flow rate necessary for maintaining a high heat transfer performance and, according to this Figure, a minimum required flow rate $\gamma^*$ (g/s.cm) is plotted on the ordinate with the heat flux q(W/cm²) being plotted along the abscissa. In FIG. 5, the solid line A represents a porous surface having a structure such as, for example, of the type disclosed in U.S. Pat. No. 4,060,125 and shown in FIG. 6, which porous surface includes a large number of tunnels or channels 10 each having a width 0.25 mm and a depth of 0.4 mm disposed with a 0.5 mm pitch below the heat transfer surface 9, and with the tunnels or channels 10 being in communication with the outer surface of the heat transfer surface by, for example, triangularly-shaped small openings or holes 11 having, for example, a diameter of an inscribed circle of 0.1 mm. In FIG. 5, the dot and dash line B represents the smooth surface which is polished by an emery #1000, with the dash line C representing an ideal flow rate at which the refrigerant evaporates completely along the heat transfer surface. For the relationship of FIG. 5, the heat transfer surface had a length of 300 mm and a width of 100 mm and was saturated with the refrigerant R-11 under atmospheric pressure as the processing fluid.

As apparent, a heat exchanger utilizing the falling film evaporation heat transfer must have stable performance and, if the heat transfer performance of such a heat exchanger changes remarkably depending upon the falling fluid rate or the like, the construction and/or design of the heat exchanger becomes difficult and the necessary heat exchange performance characteristics cannot be obtained under practical operating conditions beyond the specific design point. In this respect, it has been found that the porous heat transfer surface exhibits excellent properties.

Figure 4:
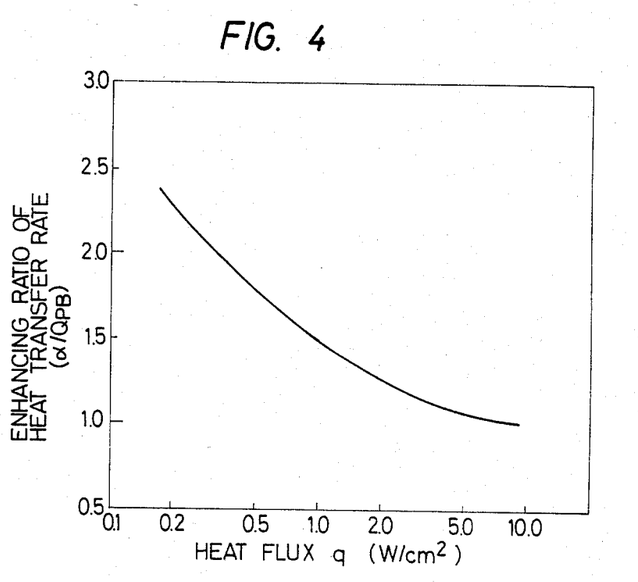
FIG. 4 is a graph illustrating a relationship between a heat transfer performance of a falling film evaporation type heat exchanger using refrigerants R-11 as a process fluid.
Figure 5:
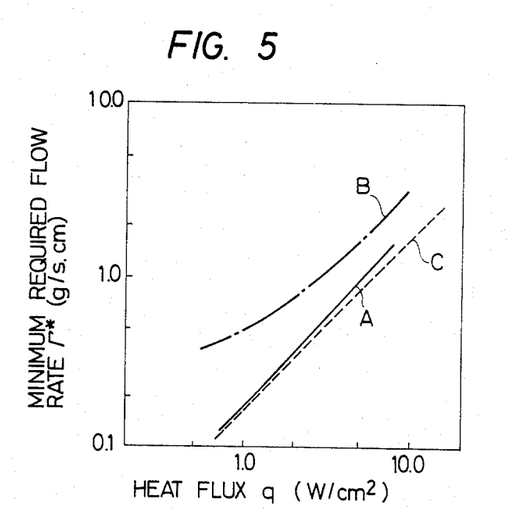
FIG. 5 is a graph illustrating a relationship between heat flux on a smooth heat transfer surface and on a porous heat transfer surface verses a minimum required flow rate of a refrigerant when the refrigerant R-11 is used as a process fluid.
Figure 6:
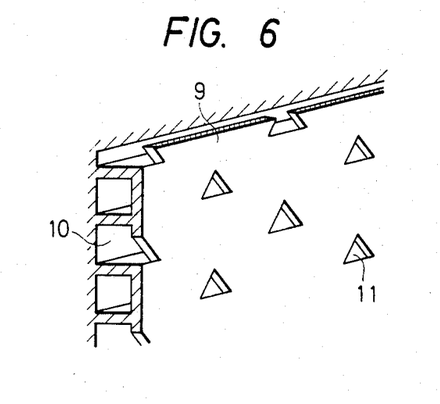
FIG. 6 is a partially schematic cross sectional view of a porous heat transfer surface used for comparison performance in the graphical relationship illustrated in FIG. 5.
Figure 7:
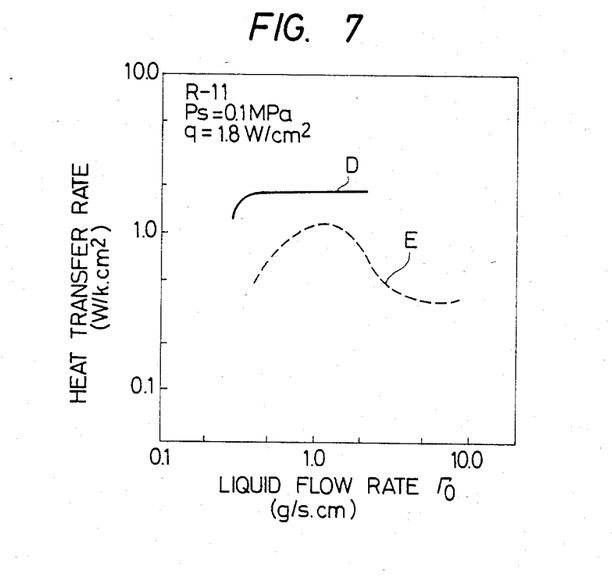
FIG. 7 is a graph illustrating a relationship between a liquid flow rate and a heat transfer rate on a heat transfer surface equipped with grooves and on a porous heat transfer surface when the refrigerant R-11 is used as the process fluid.

In this connection, as shown in FIG. 7, a graph illustrating the relationship between the fluid flow rate $\gamma_o$(g/s.cm) and the heat transfer coefficient (W/k.cm²), the solid line D represents the porous heat tranfer surface shown in FIG. 6, the dash line E represents a heat transfer coefficient of a heat transfer surface equipped with perpendicularly extending grooves having fine fins of a fin height 1.1 mm, a fin thickness of 0.4 mm, and a fin pitch of 0.8 mm, and with the size of the heat transfer surface and measuring conditions corresponding to those described hereinabove in connection with FIGS. 4 and 5.

It is also possible in accordance with the present invention to provide a heat exchanger having a variable capacity by incorporating both a falling film evaporation heat transfer and a nucleate pool boiling heat transfer having mutually different heat transfer coefficients in the same heat exchanger and controlling the respective areas that are to be governed by the respective heat transfer modes. For example as shown in FIG. 8, by providing a construction wherein the lower portions of the heat transfer tubes 12 of FIGS. 1 and 2 are exposed to liquid refrigerant, it is possible for the heat exchanger to also be of a liquid dipping type.

Figure 8:
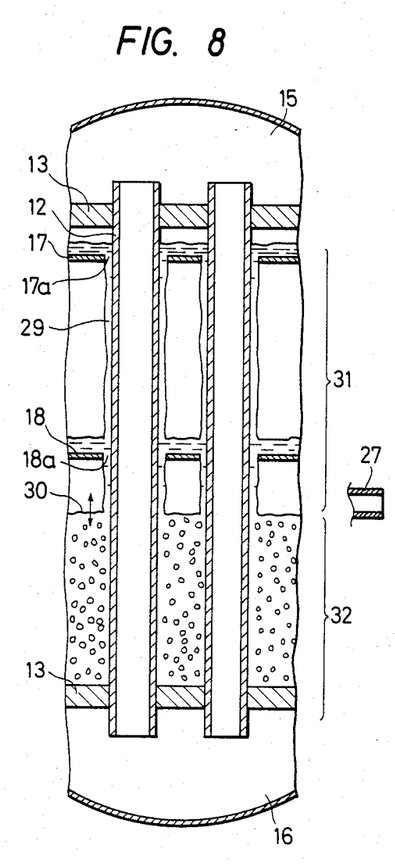
FIG. 8 is a cross sectional view, on an enlarged scale, of principle elements of a falling film evaporation type heat exchanger constructed in accordance with another embodiment of the present invention.

In the construction of FIG. 8, the refrigerant discharge port 27 is disposed at a higher position than in the embodiment of FIGS. 1 and 2, that is, advantageously, the discharge port 27 is disposed in proximity of the refrigerant distributors 18 and the amount of refrigerant remaining in the lower portion of the main frame, i.e., area between the lower tube sheet 13 and distributor 18 being increased. In the construction of FIG. 8, the lower portions of the heat transfer tubes 12 are dipped in the refrigerant and a region 31 of the falling film evaporation type heat transfer and region 32 of the nucleate pool boiling heat transfer is separated from each other by a refrigerant level 30 which forms the boundary.

When the load of the heat exchanger is great, evaporation of the refrigerant is promoted and the refrigerant level 30 drops so that the area of the falling film heat transfer portion 31 having a higher heat transfer coefficient increases and greater calories can be transferred. On the other hand, when the heat load is relatively small, the evaporation of the refrigerant is checked or slowed and the refrigerant stays inside the heat exchanger thereby raising the refrigerant level 30. Consequently, the area of the falling film evaporation heat transfer portion 31 drops and, as a result thereof, the capacity of the heat exchanger drops. Thus, a heat exchanger is provided which is capable of self controlling the heat exchange capacity in accordance with the necessary heat level since the refrigerant level 30 automatically moves up and down in accordance with the heat level and the heat exchanger performance can be varied or changed.

Figure 9:
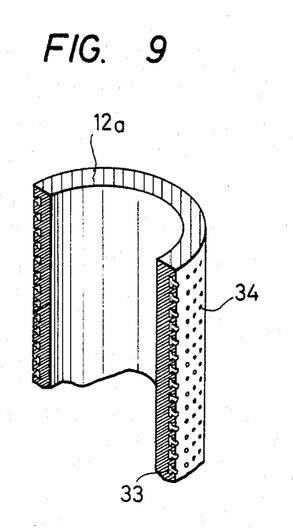
FIG. 9 is a cross sectional detail view, on an enlarged scale, of heat transfer portions of a falling film evaporation type heat exchanger constructed in accordance with still another embodiment of the present invention.

FIG. 9 provides an example of heat transfer tube portions of a falling film evaporation heat exchanger constructed in accordance with another embodiment of the present invention, wherein each of the heat transfer tubes 12a is provided with a porous heat transfer surface structure. In this connection, the heat transfer tubes 12 include a plurality of tunnels or channels 33 extending outside of the tube in a circumferential direction and small openings communicating the tunnels or channels 33 with an outer surface of the heat transfer tubes 12a. The refrigerant is sucked into the channels 33 by the surface tension and expands in a circumferential direction of the heat transfer tube while evaporating through the tunnel or channels 33. On the other hand, the refrigerant vapor evaporated inside the tunnels or channels 33 is discharged outside through the small openings 34. The shell tube of the falling film evaporation type heat exchanger of the embodiment of FIG. 9 does not cause a drop in performance of the heat exchanger even when the refrigerant flow rate is low and, consequently, a stable heat exchange performance can be realized because the refrigerant film is uniformly formed along the heat transfer tubes 12a.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A heat exchanger comprising an outer shell, a plurality of heat transfer tube means disposed substantially vertically in said outer shell, means for supplying a fluid to said heat tranfer tube means, means for supplying a liquid refrigerant, liquid refrigerant distributor means disposed at least at an upper and intermediate portion of the respective heat transfer tube means communicating with said liquid refrigerant supplying means for causing a liquid refrigerant to freely fall as a film of refrigerant along an outer peripheral surface of each of said heat transfer tube means, and vapor discharge means and liquid refrigerant discharge means disposed in a side wall of said outer shell so as to enable an evaporation of said film of refrigerant and discharge of liquid refrigerant whereby a heat exchange is effected between said fluid flowing through said heat transfer tube means and the film of refrigerant.

2. A heat exchanger according to claim 1, wherein said liquid refrigerant supplying means includes at least one liquid refrigerant header disposed along a side wall of said shell and adapted to supply liquid refrigerant to said liquid refrigerant distributor means.

3. A heat exchanger according to claim 2, wherein said liquid refrigerant distributor means includes at least two support means each provided with a plurality of openings therein for accommodating the respective heat transfer tube means.

4. A heat exchanger according to claim 3, wherein the openings in the support means are dimensioned such that a predetermined spacing is provided between the outer peripheral surface of the respective heat transfer tube means and the respective openings so as to enable a liquid film to flow from the distributor means along the outer peripheral surface of the heat transfer tube means.

5. A heat exchanger according to claim 3, wherein the liquid refrigerant discharge means are disposed in the side wall near a bottom of the shell so as to prevent an accumulation of liquid refrigerant in a lower area of the respective heat transfer tubes thereby preventing an immersion of the lower ends of the heat transfer tube means in the liquid refrigerant.

6. A heat exchanger according to claim 3, wherein the liquid refrigerant discharge means are disposed in the side wall of said shell at a predetermined distance from a bottom of said shell so as to enable an accumulation of liquid refrigerant in the shell whereby lower portions of the respective heat transfer tube means are immersed in the liquid refrigerant so as to provide for a liquid dipping-type evaporation.

7. A heat exchanger according to claim 1, wherein said liquid refrigerant distributor means includes at least two support means each provided with a plurality of openings therein for accommodating the respective heat transfer tube means.

8. A heat exchanger according to claim 7, wherein the openings in the support means are dimensioned such that a predetermined spacing is provided between the outer peripheral surface of the respective heat transfer tube means and the respective openings so as to enable a liquid film to flow from the distributor means along the outer peripheral surface of the heat transfer tube means.

9. A heat exchanger according to claim 1, wherein the liquid refrigerant discharge means are disposed in the side wall near a bottom of the shell so as to prevent an accumulation of liquid refrigerant in a lower area of the respective heat transfer tubes thereby preventing an immersion of the lower ends of the heat transfer tube means in the liquid refrigerant.

10. A heat exchanger according to claim 1, wherein the liquid refrigerant discharge means are disposed in the side wall of said shell at a predetermined distance from a bottom of said shell so as to enable an accumulation of liquid refrigerant in the shell whereby lower portions of the respective heat transfer tube means are immersed in the liquid refrigerant so as to provide for a liquid dipping-type evaporation.

11. A heat exchanger according to claim 1, wherein each of said heat transfer tube means includes a porous outer surface.

12. A heat exchanger according to claim 11, wherein said porous outer surface of each of said heat transfer tube means is formed by a plurality of circumferentially extending channel means, and a plurality of individual openings for communicating the channel means with the outer surface of the heat transfer tube means.

13. A heat exchanger according to claim 12, wherein said openings have a substantially triangular configuration.

14. A heat exchanger according to claim 1, wherein said liquid refrigerant supplying means includes at least one liquid refrigerant header disposed along a side wall of the shell and adapted to supply liquid refrigerant to said liquid refrigerant distributor means, means are disposed in said header means for dividing the same into at least an upper and lower chamber means for accommodating liquid refrigerant, and wherein a separate liquid refrigerant distributor means is communicated with the respective chamber means.

15. A heat exchanger according to claim 14, wherein the liquid refrigerant discharge means are disposed in the side wall near a bottom of the shell so as to prevent an accumulation of liquid refrigerant in a lower area of the respective heat transfer tubes thereby preventing an immersion of the lower ends of the heat transfer tube means in the liquid refrigerant.

16. A heat exchanger according to claim 14, wherein the liquid refrigerant discharge means are disposed in the side wall of said shell at a predetermined distance from a bottom of said shell so as to enable an accumulation of liquid refrigerant in the shell whereby lower portions of the respective heat transfer tube means are immersed in the liquid refrigerant so as to provide for a liquid dipping-type evaporation.

17. A heat exchanger according to claim 1, wherein said means for supplying a fluid includes an upper header disposed in an upper area of the heat transfer tube means, a lower header provided at a lower area of said heat transfer tube means, and means in the upper and lower header for defining a multiple flow path for the fluid supplied to the heat transfer tube means.

18. A heat exchanger according to claim 1, wherein the outer peripheral surface of each of the heat transfer tube means includes a plurality of individual grooves having fins of a predetermined fin height.

* * * * *